Sept. 14, 1965 H. K. RICHTER 3,205,707
PERFORMANCE METER
Filed Sept. 3, 1957 3 Sheets-Sheet 3
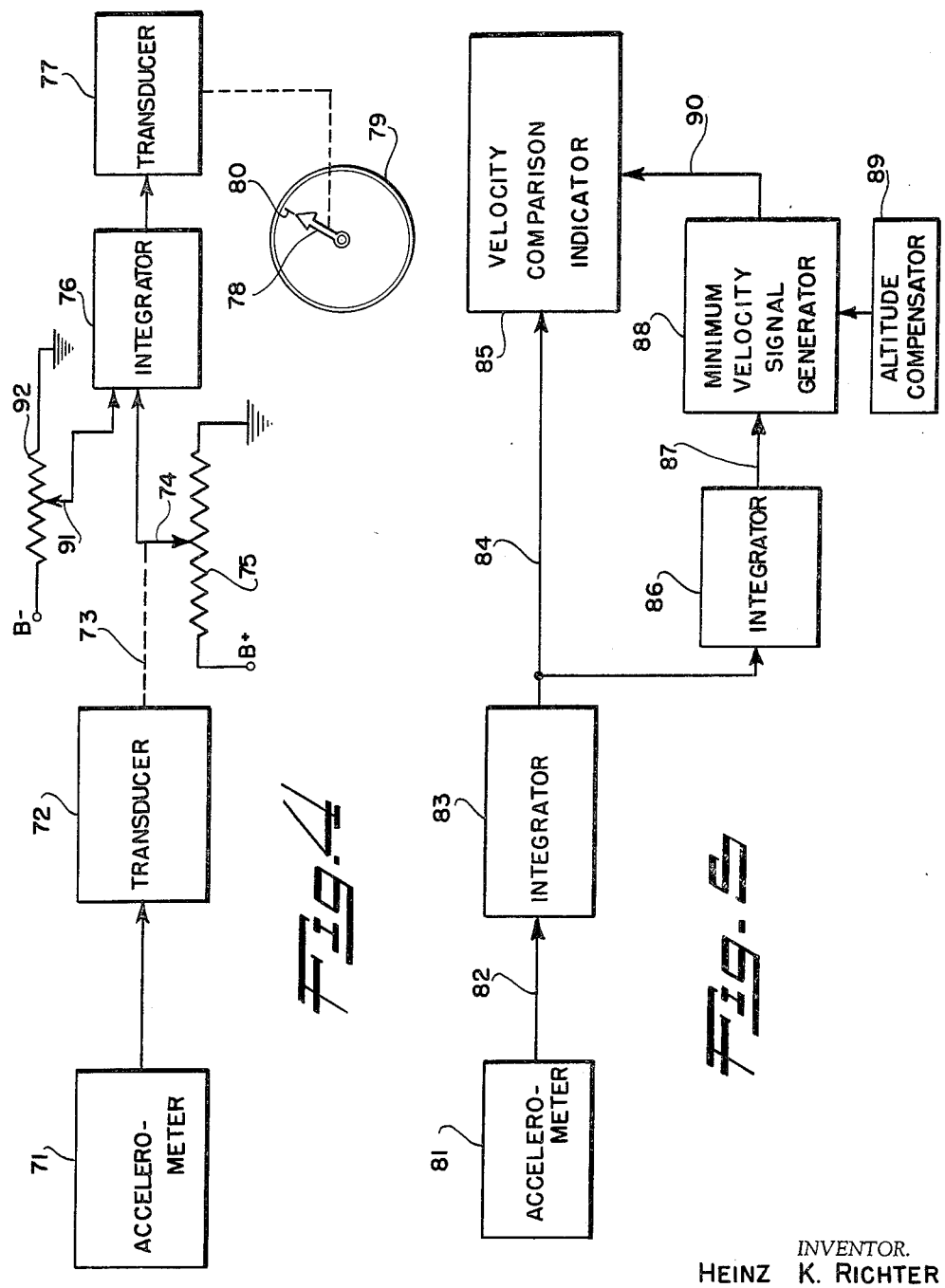
INVENTOR.
HEINZ K. RICHTER
BY
George C. Sullivan
Agent

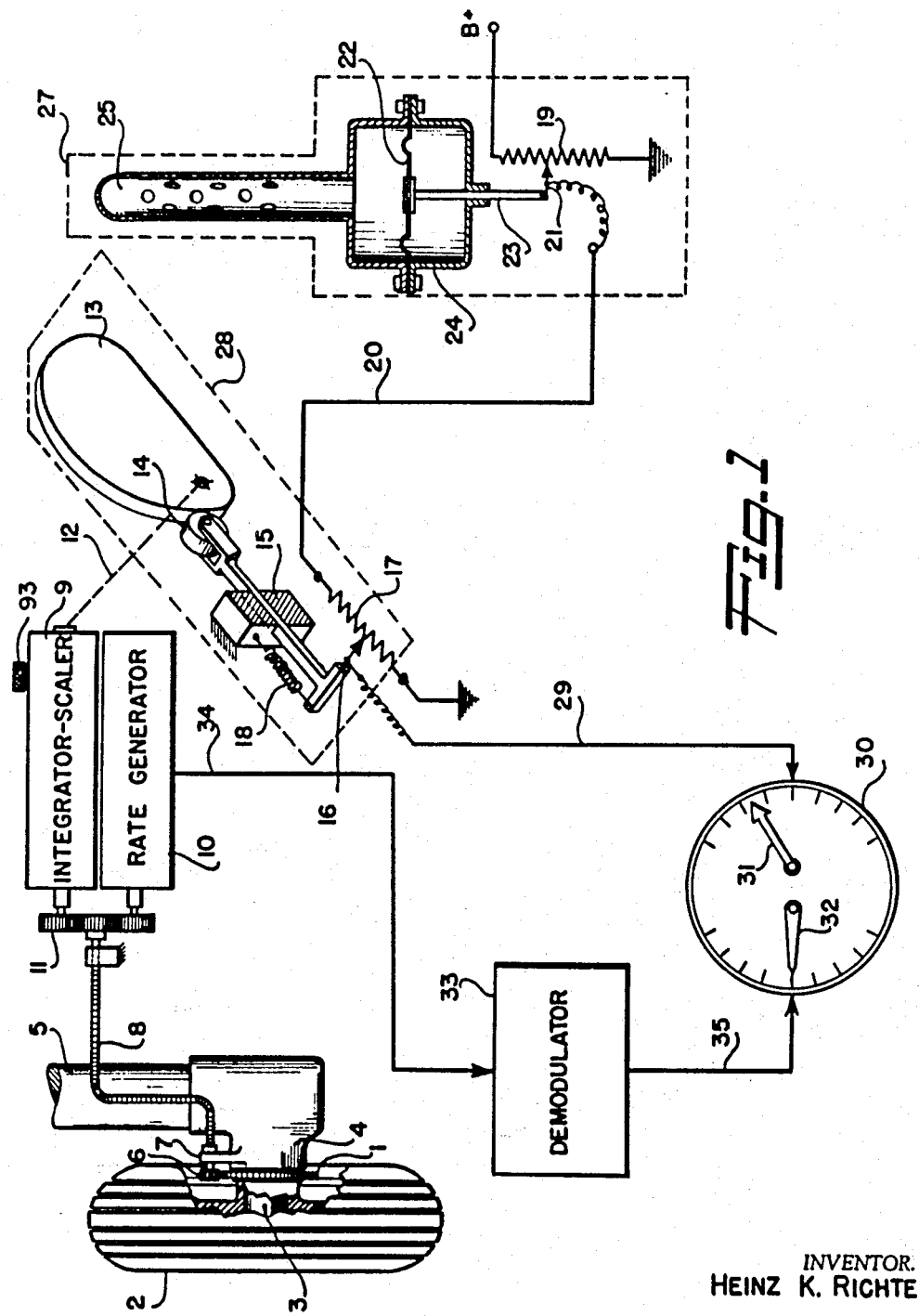

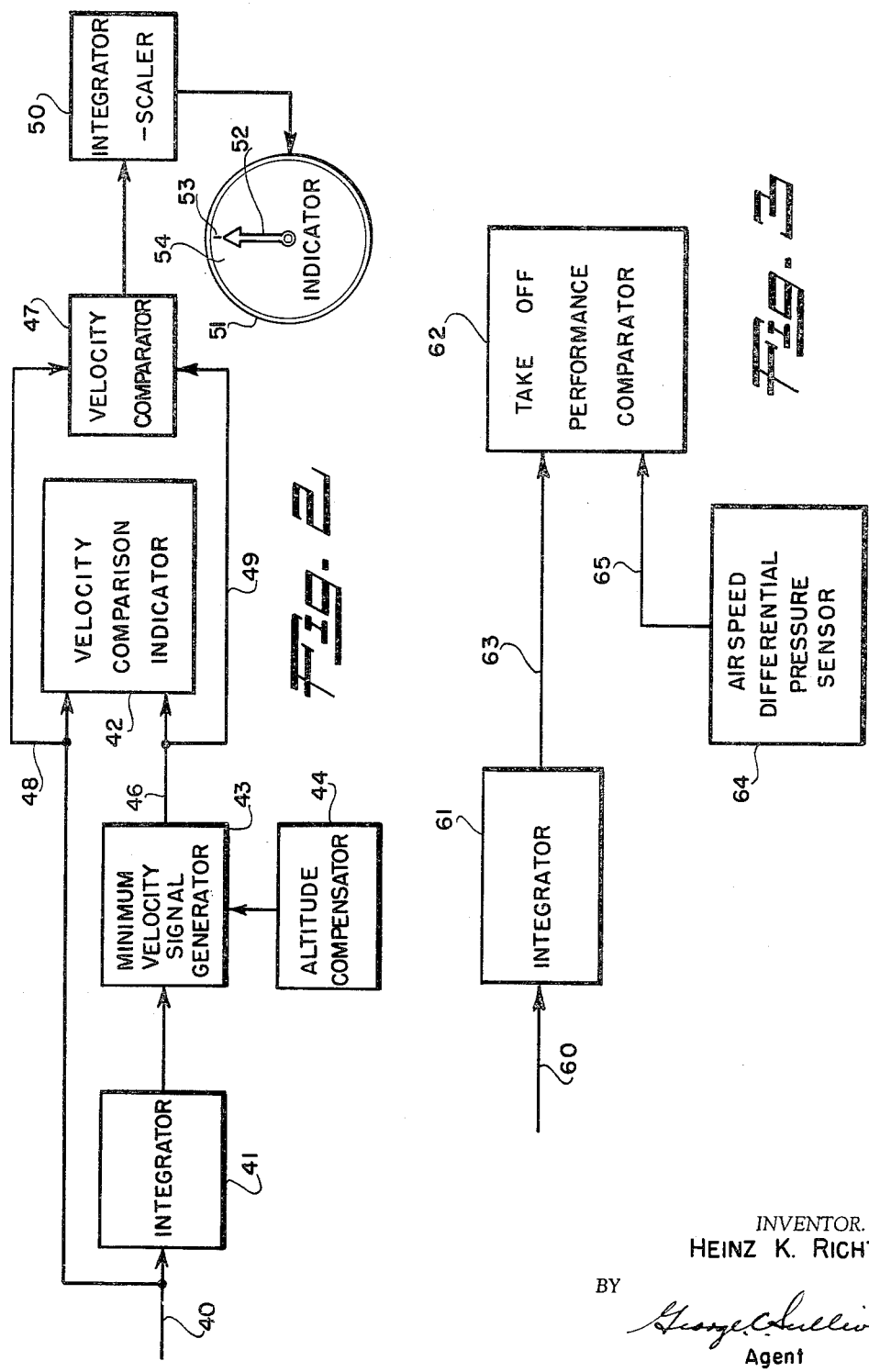

United States Patent Office 3,205,707
Patented Sept. 14, 1965

---

3,205,707
PERFORMANCE METER
Heinz K. Richter, Los Angeles, Calif., assignor to Lockheed Aircraft Corporation, Burbank, Calif.
Filed Sept. 3, 1957, Ser. No. 681,675
3 Claims. (Cl. 73—178)

This invention relates generally to precision measuring instruments and more particularly to a performance meter for aircraft and other vehicles to indicate to the operator during an acceleration run a comparison between the actual performance and the desired performance.

The instrument when installed in an aircraft will provide the pilot with reliable information as to whether the velocity and acceleration rate during take-off are adequate to avoid overshooting the runway. This information is presented continuously throughout the take-off run providing ample opportunity to take corrective measures in case the performance is inadequate to permit a safe take-off on any particular runway.

As background on this invention it should be recognized that the airplane take-off distance is a complicated function of the available thrust, the air and ground resistance, the altitude, the wind conditions and the aircraft loading conditions. During the ground run the determination of whether the airplane acceleration is adequate depends mostly on the pilot's judgment. With piston engine aircraft having relatively short take-off runs this is probably adequate; however with jet aircraft and particularly those of the large transport type having long ground runs in the order of 5,000 feet or more it is extremely difficult to judge the airplane acceleration during the take-off run and some reliable means for measuring performance is needed.

An object of this invention is to provide a performance meter which will relieve the pilot of the responsibility for exercising judgment as to the airplane's acceleration and provide means by which he may readily determine from an indicator whether or not his ground speed at any point in the take-off run is above or below the required minimum at that point. Thus, the pilot is given ample opportunity to stop his take-off run safely and without overshooting the runway in the event his attained ground speed is below that required for a normal take-off.

Another object of this invention is to provide a performance meter which will indicate directly and at any point of the take-off run whether or not the actual velocity is above or below a predetermined minimum or desired velocity whereby sporadic gains or losses in acceleration relative to the norm are averaged to reliably indicate the total performance. By this means, fluctuations in acceleration are prevented from introducing unsteady meter readings which might be confusing and difficult to interpret.

It is another object of this invention to provide a performance meter which may be packaged as a lightweight unit suitable for all types of aircraft as well as other vehicles.

Still another object of this invention is to provide a performance meter which is simple to use and install and which will operate dependably to provide accurate results with little or no maintenance.

Further and other objects will become apparent from a reading of the following description especially when considered in combination with the accompanying drawings wherein like numerals refer to like parts.

In the drawings:
FIGURE 1 is a schematic view showing one form of the performance meter;
FIGURE 2 is a block diagram showing a second form for the performance meter;
FIGURE 3 is a block diagram showing a third form for the performance meter;
FIGURE 4 is a schematic block diagram showing another form for the performance meter; and
FIGURE 5 is a block diagram showing still another circuit arrangement for the invention.

Referring to the FIGURE 1 configuration, the input function to the performance meter is vehicle velocity and this is obtained through the use of a spur gear 1 which is secured to a part of the vehicle suspension system which rotates with one of the wheels. For purposes of illustration the performance meter of FIGURE 1 shall be identified in connection with an aircraft installation in which case spur gear 1 is attached as shown in the drawing to the hub 3 of landing gear wheel 2. The hub is rotatably supported on an axle 4 carried by the landing gear oleo strut 5. A pinion gear 6 is secured to a fixed portion of the landing gear such as axle 4 through a suitable bracket 7 for meshing with spur gear 1. A flexible shaft 8 is coupled to pinion 6 for transmitting the pinion rotation to a mechanical integrator scaler 9 and rate generator 10 through suitable gearing 11. Normally, the integrator and rate generator are located in the aircraft (not shown) remote from the landing gear. The mechanical integrator is of the type provided with an output shaft 12 the rotational position of which is proportional to the distance travelled by the aircraft from the start of take-off. Such an integrator may be found in volume 21 of the Radiation Laboratory Series publication entitled: "Electronic Instruments," by Greenwood, Holdam and MacRae, 1948 edition. Either the type shown in FIGURE 4.33 and described on pages 86 and 87 or the type shown in FIGURE 4.34 and described on pages 88 and 89 of this publication may be used. The $x$ input of FIGURES 4.33 and 4.34 of the publication correspond with the input to integrator 9 through gearing 11. The $r$ adjustment is fixed. A cam 13 shaped to represent the desired or minimum velocity of the particular aircraft for a normal take-off is secured to shaft 12 to rotate therewith. A cam follower 14 is carried by suitable fixed structure 15 for movement as directed by cam 13 to position the pick-off arm 16 of a potentiometer 17. Suitable means such as spring 18 may be employed to maintain cam follower 14 in engagement with the cam. Potentiometer 17 is connected to a suitable source of electrical potential identified as B+ through a second potentiometer 19. Lead 20 from potentiometer 17 is electrically coupled to the pick-off arm 21 of potentiometer 19. Pick-off arm 21 is mechanically coupled to a pressure diaphragm 22 through shaft 23. The diaphragm is mounted within an enclosure 24 one side of which is sealed and the opposite side of which is coupled to a static tube 25 for detecting the ambient air pressure. Thus the position of diaphragm 22 and hence the position of pick-off arm 21 on potentiometer 19 is dictated by the ambient air pressure. These two elements, potentiometer 19 and static tube 25, which regulate the B+ voltage to potentiometer 17 serve as an altitude compensator for the performance meter to automatically adjust the indicator for use on runways at any altitude and various atmospheric conditions. The gas pressure in the sealed portion of the enclosure on one side of the diaphragm may be any desired pressure. The only requirement here is that the pressure be substantially constant throughout a take-off run.

Cam 13 and its associated potentiometer 17 serve as a desired or minimum velocity signal generator 28 wherein an output voltage from potentiometer 17 is obtained at lead 29 which is proportional in magnitude to a predetermined velocity variation which is needed for a normal take-off. This voltage or desired velocity signal obtained at pickoff 16 is fed through lead 29 to a velocity meter 30. Meter 30 may be of conventional design such as the Model 827 dual ammeter manufactured by the Weston Electrical Instruments Corporation. This meter has two independently controlled needles 31 and 32. One of the needles is positioned by the desired velocity signal to provide a visual sensory indication of the desired aircraft velocity throughout the take-off run. The other needle is positioned in accordance with the actual aircraft velocity.

The actual velocity signal is obtained at rate generator 10 and is applied to a demodulator 33 through lead 34 to convert the rate generator output signal into a direct current signal similar to the desired velocity signal and suitable for use with velocity meter 30. The demodulator output is applied to the velocity meter through lead 35 to position the other needle. As implied above, rate generator 10 may be of the alternating current type such as is disclosed in volume 21 of the Radiation Laboratory Series publication entitled: "Electronic Instruments," by Greenwood, Holdam and MacRae, 1948 edition, pages 74 through 76. Also, the demodulator employed in the circuit with the alternating current type rate generator may be a phase detector such as is disclosed in the same radiation laboratory series publication at pages 383 through 385, Figure 12.15(a).

The velocity meter 30 when properly calibrated will provide a sensory indication of both the actual velocity and the desired velocity from which the pilot may observe take-off performance. So long as the actual velocity is at least as high as the desired velocity the pilot is assured of adequate performance for a normal take-off.

It should be understood that the performance meter is basically a device for comparing an actual performance function and the desired variation of that function. The particular structure for accomplishing this comparison may take many forms and FIGURES 2 through 5 are presented to illustrate a number of these forms.

Referring to FIGURE 2, the airplane ground speed input 40, which may be an electrical signal proportional to the ground speed such as that available at lead 35 in FIGURE 1, is applied to an integrator 41 and a velocity comparison indicator 42. The velocity comparison indicator may be like meter 30 in FIGURE 1, for example, an integrator 41 may be like Figure 4.29 shown and described on pages 83 and 84 of the Radiation Laboratory Series publication by Greenwood, Holdam and MacRae referred to above. The output of integrator 41 is applied to a minimum velocity signal generator 43 which may be like signal generator 28 shown in FIGURE 1. The output of signal generator 43 is modified by an output from altitude compensator 44 which may be like that shown in FIGURE 1 or any reasonable equivalent thereof. For example, altitude compensation may be obtained manually by eliminating static tube 25 in FIGURE 1 and adjusting the position of wiper 21 on potentiometer 19 by hand.

The output of minimum velocity signal generator 43 is applied to velocity comparison indicator 42 through lead 46. Velocity comparison indicator 42 having the actual velocity input through lead 40 and the desired velocity input through lead 46 applied thereto presents a sensory indication of the difference between the two velocity inputs in a manner such as that described in connection with FIGURE 1. Also, in this configuration as shown in FIGURE 2, the actual velocity and desired velocity signals are applied to a differential or velocity comparator 47 through leads 48 and 49 respectively. A suitable differential for this purpose is described and shown on pages 32 and 33 of vol. 21 of the Radiation Laboratory Series publication entitled: "Electronic Instruments," by Greenwood, Holdam and MacRae, 1948 edition. Velocity comparator 47 detects the difference velocity between the two inputs and applies this difference to an integrator scaler 50 which may be a simple RC integrator. The output from integrator 50 drives an indicator 51 which may be a conventional galvanometer provided the output from integrator 50 is an electrical voltage. Since indicator 51 itself indicates the difference velocity, the use of only one needle 52 is necessary. Calibration of the indicator need involve establishing only one mark 53 on dial 54. Mark 53 on the indicator dial represents the zero difference needle position and any difference between the actual velocity and the desired velocity will be indicated by a needle position off the mark. If the actual velocity falls below the desired velocity at any point in the take-off run and this deficiency in performance is not made up, needle 52 will fall below mark 53 and if the actual velocity is above the desired or minimum velocity, needle 52 will be above mark 53.

Since in using the instrument to measure take-off performance it is only necessary to know that the actual velocity is equal to or above the desired or minimum velocity, only one threshold mark need be provided on indicator 51; however, additional marks showing the magnitude of the velocity difference between the two inputs to comparator 47 may be used if desired.

Velocity comparator 47 may be of conventional design. Its function is to detect the difference between the actual velocity and the desired velocity inputs. Since there are numerous mechanical, electro-mechanical and electronic devices commercially available to perform this function it is shown only diagrammatically in FIGURE 2.

Actually, velocity comparison indicator 42 in the FIGURE 2 circuitry is the functional equivalent of the indicator 51 and one may be used in lieu of the other.

The configuration of FIGURE 3 shows the airplane actual velocity or ground speed input 60 applied to an integrator 61 which may be like integrator 41 in FIGURE 2. The output of integrator 61 is a signal representing distance from the start of take-off which is applied to a take-off performance comparator 62 through connection 63. Comparator 62 may be constructed by combining the minimum velocity signal generator 28, velocity comparator 47, integrator 50 and totalizer 51 of FIGURE 2 or minimum velocity signal generator 28 and meter 30 of FIGURE 1. An airspeed differential pressure sensor device 64 such as those commonly used on aircraft to measure airspeed provides a second input to comparator 62 as represented by lead 65 which input represents actual velocity. Comparator 62 obtains the actual velocity measurement from differential pressure sensor 64 and compares it with the internally generated desired velocity signal. Altitude compensation may be automatically obtained through the use of the differential pressure sensor. An airspeed measuring device suitable for use as a differential pressure sensor 64 is disclosed in United States Letters Patent 2,318,153 as the Pitot-static head, indicated airspeed meter and potentiometer $R_1$ which provides a voltage proportional to velocity.

The current flowing in the $R_1$ potentiometer circuit of the patent represents actual velocity.

A function other than velocity may be employed to measure take-off performance. This is illustrated in FIGURE 4 wherein airplane acceleration is applied to an accelerometer 71 such as is disclosed in United States Letters Patent 2,677,270. The output of accelerometer 71 drives a suitable transducer 72 having a mechanical output as indicated at 73 to position wiper arm 74 on potentiometer 75 according to the magnitude of the accelerometer output. Transducer 72 may be a conventional position servo-motor such as shown and described on page 15 of the book entitled: "Electronic Analogue Computers," by Korn and Korn, published in 1952; the potentiometer shown in this publication being the equivalent of potentiometer 75 herein. Potentiometer 75 is coupled to a suitable source of electrical potential identified as B+ and to ground whereby its output obtained through pickoff arm 74 is a voltage proportional to the airplane acceleration. This output is combined in an integrator 76 with a desired acceleration signal obtained from pickoff 91 of a fixed calibrating potentiometer 92. Potentiometer 92 is coupled to a suitable source of negative potential identified as B—. As is indicated above, integrator 76 performs two functions, one to obtain the difference between actual and desired accelerations and the other to obtain the integral of the difference with respect to time. A suitable integrator for this purpose is disclosed in vol. 21 of the Radiation Laboratory Series publication entitled: "Electronic Instruments," by Greenwood, Holdam and MacRae, 1948 edition; at pages 33, Figure 3.1(a) and 78, Figure 4.19, the output of the parallel impedance network being coupled to the input of the RC integrating circuit.

If an airplane is operated from airfields having different runway lengths it may be advantageous to provide manual adjustment of pickoff 91 on potentiometer 92 for recalibrating the device to different acceleration rates corresponding to the different runway lengths.

The acceleration difference signal at integrator 76 is integrated and applied to a suitable transducer 77 mechanically positioning a needle 78 on totalizer indicator 79. So long as the actual acceleration is equal to the desired acceleration needle 78 will aim at threshold mark 80. Whenever the actual acceleration is above or below the desired acceleration the needle will so indicate.

Where the desired acceleration is to be made variable, a modification to the FIGURE 4 circuitry such as that shown in FIGURE 5 may be employed and still retain an accelerometer type input device. In the FIGURE 5 configuration, accelerometer 81 has its output 82 applied to an integrator 83 which may be a simple RC integrator. By integrating the acceleration output a velocity function is obtained at 84. This velocity function is applied to velocity comparison indicator 85 and to an integrator 86. The output of integrator 86 represents distance travelled from a predetermined starting point such as the start of take-off. Integrator 86 may be of the type having a voltage input and a mechanical output such as is disclosed on pages 83 and 84 (Figure 4.29) of vol. 21, Radiation Laboratory Series publication entitled: "Electronic Instruments," by Greenwood, Holdam and MacRae, 1948 edition. This distance output obtained at 87 is applied to a minimum or desired velocity signal generator 88 which may be similar in construction to desired velocity signal generator 28 as shown in FIGURE 1. An altitude compensator 89 like 27 in FIGURE 1 may be employed in connection with signal generator 88 to provide a desired velocity output signal corrected to any altitude. This output signal from the signal generator is applied to velocity comparison indicator 85 through lead 90 to provide a sensory indication of the difference between the actual velocity and the desired velocity.

The device described above in its several configurations as represented by FIGURES 1 through 5 is made operative at the beginning of the performance period to be measured. This may be accomplished by manually pushing a reset or start button 92 shown mounted on integrator 9 in FIGURE 1, for example. Resetting the integrator returns the cam in the minimum velocity signal generator to the start position. As the aircraft begins the take-off run, the cam is driven according to the distance traveled to provide the desired velocity signal. The actual velocity is detected at the input and the two signals are applied to the velocity meter for indicating take-off performance.

The altitude compensator forming a part of the performance meter automatically adjusts the device for the take-off air pressure conditions actually existing at the time. Without altitude compensation the desired velocity meter reading would vary only as a function of the take-off distance and under extreme atmospheric conditions this could cause substantial errors in the performance reading. It should be understood however that many of the advantages taught by this invention could be obtained without incorporating the altitude compensating feature.

The configurations shown by FIGURES 4 and 5 differ in operation from the configurations of FIGURES 1 through 3 only in the detection of aircraft acceleration rather than velocity by the input transducer. Subsequent operations wherein the aircraft performance is compared with the desired performance are substantially the same.

It should be understood that certain alterations, modifications and substitutions may be made to the instant disclosure without departing from the spirit and scope of the invention as defined by the appended claims.

I claim:

1. A take-off performance meter for comparing the actual acceleration of a vehicle with a predetermined desired acceleration comprising, means responsive to actual vehicle motion in a predetermined direction with respect to the vehicle and providing a signal proportional thereto, means generating a signal representing the desired vehicle motion in the same predetermined direction with respect to the vehicle, and comparator means responsive to both said means and providing an output representing the integrated difference between the actual vehicle acceleration and the desired vehicle acceleration.

2. A performance meter for checking vehicle acceleration relative to a predetermined desired acceleration during take-off comprising, accelerometer means detecting actual vehicle acceleration and providing an output proportional thereto, means providing a reference signal representing the desired vehicle acceleration, and comparator means connecting with the last mentioned means and said accelerometer means and providing an output representing the integrated acceleration difference between the actual vehicle acceleration and the desired vehicle acceleration.

3. A performance meter for checking vehicle acceleration relative to a predetermined desired acceleration during take-off comprising, accelerometer means detecting actual vehicle acceleration and providing a signal proportional thereto, means providing a reference signal representing the desired vehicle acceleration, comparator means connecting with the last mentioned means and said accelerometer means and providing an output representing the integrated acceleration difference between the actual vehicle acceleration and the desired vehicle acceleration, and an indicator driven by said comparator means and providing a sensory indication of the total performance difference.

References Cited by the Examiner

UNITED STATES PATENTS

| | | | |
|---|---|---|---|
| 2,134,132 | 10/38 | Koster | 73—178 |
| 2,182,706 | 12/39 | Shanley | 73—178 X |
| 2,500,545 | 3/50 | Herbst | 73—178 X |
| 2,562,186 | 7/51 | Hallman | 73—178 X |
| 2,706,407 | 4/55 | Hosford | 73—182 |
| 2,724,564 | 11/55 | Newton et al. | 244—77 |
| 2,799,461 | 7/57 | Anderson et al. | 244—77 |
| 2,807,165 | 9/57 | Kuzyk et al. | 73—178 |
| 2,814,688 | 11/57 | Kutzler. | |

OTHER REFERENCES

NACA Technical Note 3252, published by NACA, Washington, D.C., November 1954.

LAVERNE WILLIAMS, *Primary Examiner.*

L. R. PRINCE, ISAAC LISANN, ROBERT B. HULL,
*Examiners.*